United States Patent Office 3,222,083
Patented Dec. 7, 1965

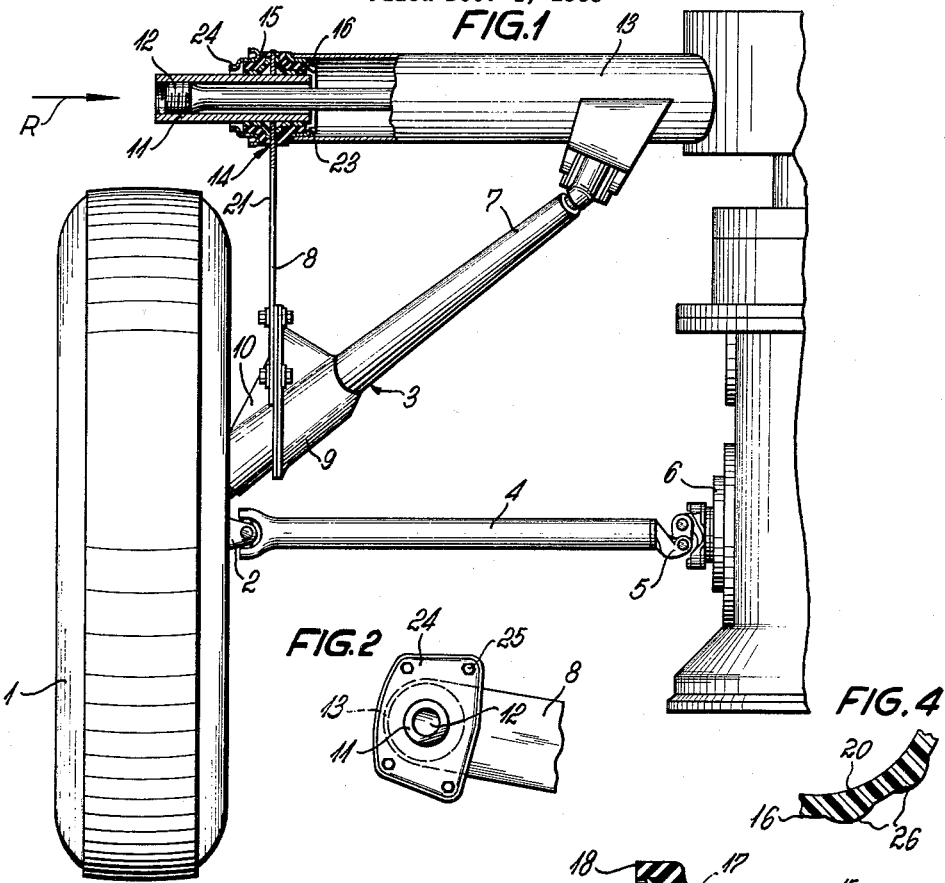
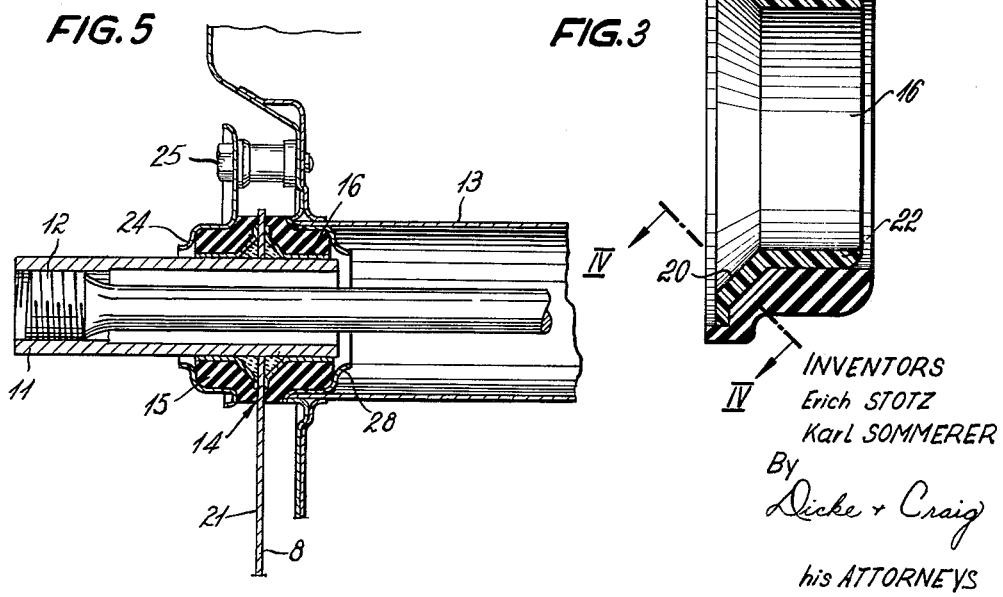

3,222,083
WHEEL SUSPENSION FOR VEHICLES
Erich Stotz, Rommelshausen, Wurttemberg, and Karl Sommerer, Stuttgart-Zuffenhausen, Germany, assignors to Firma Dr. Ing. H.c.F. Porsche K.G., Stuttgart-Zuffenhausen, Germany
Filed Dec. 4, 1963, Ser. No. 328,029
3 Claims. (Cl. 280—124)

The present invention relates to a wheel suspension for vehicles, especially for motor vehicles, having a torsion-resistant swinging strut serving for the wheel guidance which is under the effect of a torsion rod spring and is supported at the frame or body of the vehicle by a coupling sleeve with the interposition of a rubber joint.

With the known wheel suspensions of this type, the coupling sleeve connected with the swinging strut into which engages a torsion rod serving for the spring support, is supported within the frame cross bearer by the interposition of a rubber bushing. The secure mounting of the coupling sleeve, however, is only assured when the rubber bushing is inserted into the cross bearer with a considerable pre-stress. Consequently, during the spring deflections of the wheel against the effect of the torsion rod spring, the friction forces of the rubber bushing resulting from the pre-stress have to be overcome at the same time whereby undesired return forces become effective in the spring system.

According to the present invention, these disadvantages are avoided in that the rubber joint consists of two bearing rings arranged on both sides of the swinging strut which are clamped one against the other by the interposition of bushings with slight friction value. This construction of the rubber joint, in addition to good insulating and wear properties, has the advantage that the coupling sleeve connected with the torsion rod and the swinging strut may swing freely to and fro in a circumferential direction and no return forces can occur. A favorable mounting and securing of the coupling sleeve in the axial and radial direction results in accordance with the present invention from the fact that the bushings of slight friction value are guided on the coupling sleeve and are provided with a flange which abuts against the swinging strut. The bushings consist advantageously of plastic material, preferably of a material chosen from the general class of the polyamides or of a material coated with such plastic material. The sliding properties of these materials make it possible to assure a service-free joint construction with a one-time addition of lubricant. In order to avoid rotation of the bushings within the bearing rings, the bushings are form-lockingly connected in the circumferential direction with the bearing rings by means of a grooved or serrated cross section. The bearing rings are provided with a sealing lip partially surrounding the flange of the bushings which sealing lip in the unstressed condition projects beyond the flange. During clamping of the bearing rings, the sealing lips press against the swinging strut and prevent in this manner the penetration of dirt and/or water into the joint.

Accordingly, it is an object of the present invention to provide a wheel suspension for vehicles, especially a swinging strut bearing support for motor vehicles, of the type described hereinabove which obviates by simple means and in an operationally reliable manner the disadvantages and shortcomings encountered with the prior art constructions.

Another object of the present invention resides in the provision of a wheel suspension for vehicles utilizing a swinging strut and a torsion rod spring in which the secure mounting of the coupling sleeve is assured without pre-stressing of the rubber bushing during installation thereof into the cross bearer.

A further object of the present invention resides in the provision of a wheel suspension utilizing a swinging strut operatively connected with a torsion rod in which undesirable return forces are effectively eliminated that might otherwise arise as a result of friction forces of the rubber bushings due to the pre-stressing thereof.

A still further object of the present invention resides in the provision of a wheel suspension utilizing a swingable strut operatively connected with a torsion rod spring by means of a coupling sleeve and rubber bushing joint assembly which exhibits excellent insulating and wear properties.

Another object of the present invention resides in the provision of a rubber joint supporting the coupling sleeve of the swinging strut within the frame member which permits free to-and-fro swinging movements of the coupling sleeve and of the swinging strut without creating any return forces.

Still a further object of the present invention resides in the provision of a wheel suspension for motor vehicles of the type described hereinabove which not only excels as a favorable support of the coupling sleeve in the axial and radial direction, but also as a reliable sealing of the rubber joint.

These and other objects, features, and advantages of the present invention will become more obvious from the following description when taken in connection with the accompanying drawing which shows, for purposes of illustration only, one embodiment in accordance with the present invention, and wherein—

FIGURE 1 is a plan view on the rear wheel suspension of a motor vehicle with a swinging strut bearing support in accordance with the present invention, shown partly in cross section;

FIGURE 2 is a partial side-elevational view of a swinging strut bearing support taken in the direction of arrow R of FIGURE 1;

FIGURE 3 is a longitudinal cross-sectional view, on an enlarged scale, through a bearing ring forming the swinging strut joint and provided with an inserted sliding bushing in the relieved condition thereof;

FIGURE 4 is a partial cross-sectional view through the sliding bushing in accordance with the present invention taken along line IV—IV of FIGURE 3; and FIGURE 5 is a detailed cross-sectional plan view of a swinging strut bearing support in accordance with the present invention.

Referring not to the drawing wherein like reference numerals are used throughout the various views to designate like parts, and more particularly to FIGURES 1 and 5, reference numeral 1 designates therein the rear wheel of a motor vehicle which is guided by means of a wheel guide structure generally designated by reference numeral 3, operatively connected with the wheel hub 2 and operable to swing substantially in the driving direction. The drive of the wheel 1 takes place by a double-jointed shaft 4 which is in driving connection by way of an extensible universal joint 5 with the drive shaft of a conventional axle gear 6, not illustrated herein in detail. The wheel guide structure 3 is composed of an arm 7 directed obliquely to the vehicle longitudinal axis and of a swinging strut 8 which is secured at brackets 9 and 10 of the arm 7. The swinging strut 8 is constituted by an upright leaf spring which at its free end is connected with a transversely directed coupling sleeve 11. The coupling sleeve 11 extends through the swinging strut 8 and serves for the accommodation of a torsion rod spring 12 effecting the spring support of the wheel which is non-rotatably held within a hollow frame cross bearer 13. A rubber joint generally designated by reference numeral 14 arranged within the hollow cross bearer 13 is provided for the rotatable support of the swinging strut 8. The rubber joint consists of two bearing rings 15 of identical dimensions and of two bushings 16 also of identical dimensions and made of plastic material selected from the general class of the polyamides. The bearing rings 15 are arranged on both sides of the swinging strut 8 within the plane of the cross bearer 13. The bearing ring 15 is made of rubber and is provided with a conical aperture 17 (FIGURE 3) for the accommodation of the plastic bushing 16 and possesses a sealing lip 18, which faces the swinging strut 8 and projects in the relieved condition beyond a flange 19 of the bushing 16. The bushing 16 which possesses a conical seating surface 20 is inserted into the bearing ring 15 and abuts with the flange 19 thereof against the side surface 21 of the swinging strut 8. The hub portion 22 of the bushing 16 slides on the circumferential surface of the coupling sleeve 11. The bearing ring 15 is inserted on the side near the frame into a pot-shaped housing part 23 of the cross bearer 13. The oppositely disposed bearing ring 15 is held within a cover 24 which is clamped by means of bolts or screws 25 against the cross bearer 13 or the vehicle body. The bearing rings 15 in the cover 24 and in the housing part 23 are clamped against one another upon tightening of the bolts 25 so that the plastic bushings 16 come into abutment with the flange 19 thereof against the swinging strut 8 and the sealing lips 18 of the bearing rings 15 abut sealingly against the side surfaces of the swinging strut 8.

During the spring deflections of the wheel, the swinging strut 8 together with the coupling sleeve 11 is guided within the plastic bearings in the axial and radial direction whereby the rotary movement is slidingly absorbed within the bushings 16. In order to avoid a relative rotation of the plastic bushings 16 with respect to the bearing rings 15 during the swinging movement of the strut 8, a grooved or serrated cross section 26 (FIGURE 4) is provided along the circumference of the conical seating surface 20 of the bushing 16 which, during stressing of the rubber joint 14, presses into the bearing rings 15. Instead of plastic bushings 16, a metal bushing or the like provided with a coating of plastic material may also be utilized with the joint construction of the present invention.

While we have shown and described one embodiment in accordance with the present invention, it is understood that the same is not limited thereto but is susceptible of numerous changes and modifications within the spirit and scope thereof as known to a person skilled in the art; and we, therefore, do not wish to be limited to the details shown and described herein but intend to cover all such changes and modifications as are encompassed by the scope of the appended claims.

We claim:
1. A wheel suspension for vehicles, especially motor vehicles having a vehicle superstructure, comprising:
   torsion-resistant swinging strut means serving for purposes of wheel guidance,
   torsion rod spring means operatively connected with said strut means,
   and means rotatably supporting said swinging strut means at said vehicle superstructure including coupling sleeve means operatively connected with said swinging strut means and elastic joint means between said coupling sleeve means and said superstructure, said elastic joint means including bearing ring means arranged on each side of said swinging strut means, bushing means with slight friction value interposed between said bearing ring means and said coupling sleeve means, and means for clamping said bearing ring means against one another,
   said bushing means being guided on said coupling sleeve means and being provided with flange means supported against said swinging strut means,
   and said bearing ring means being provided with sealing lip means partially surrounding the flange means of the bushing means, said sealing lip means projecting beyond said flange means in the unstressed conditiin thereof.
2. A wheel suspension for vehicles, especially motor vehicles having a vehicle superstructure, comprising:
   torsion-resistant swinging strut means serving for purposes of wheel guidance,
   torsion rod spring means operatively connected with said strut means,
   and means rotatably supporting said swinging strut means at said vehicle superstructure including coupling sleeve means operatively connected with said swinging strut means and elastic joint means between said coupling sleeve means and said superstructure, said elastic joint means including bearing ring means arranged on each side of said swinging strut means, bushing means with slight friction value interposed between said bearing ring means and said coupling sleeve means, and means for clamping said bearing ring means against one another,
   said bushing means being guided on said coupling sleeve means and being provided with flange means supported against said swinging strut means,
   said bushing means being made at least in part of plastic material selected from the group of the polyamides,
   said bushing means being form-lockingly connected in the circumferential direction with said bearing ring means by a grooved cross section,
   and said bearing ring means being provided with sealing lip means partially surrounding the flange means of the bushing means, said sealing lip means projecting beyond said flange means in the unstressed condition thereof.
3. In a wheel suspension for vehicles, especially for motor vehicles, having a torsion-resistant swinging strut serving for the wheel guidance which is under the influence of a torsion rod spring and is pivotally supported at the frame or body of the vehicle by means of a coupling sleeve with the interposition of an elastic joint,
   the improvement essentially consisting of said elastic joint including bearing ring means arranged on each side of the swinging strut, means for clamping said bearing ring means in a direction toward one another, and bushings having a slight friction value interposed between said bearing ring means and said coupling sleeve,
   said bushings being guided on said coupling sleeve and being each provided with a flange which abuts against said swinging strut,
   said bushings being form-lockingly connected in the circumferential direction with the bearing rings by an externally grooved profile,
   and the bearing rings being provided with sealing lips partially surrounding the flange of the bushings which project beyond the flange in the unstressed condition thereof.

References Cited by the Examiner

UNITED STATES PATENTS

| | | | |
|---|---|---|---|
| 2,457,583 | 12/1948 | McCaslin. | |
| 2,461,626 | 2/1949 | Booth. | |
| 2,713,498 | 7/1955 | Brown | 280—104.5 |
| 2,950,774 | 8/1960 | Eyb | 180—73 |
| 3,011,219 | 12/1961 | Williams. | |

FOREIGN PATENTS 427,803    11/1947    Italy.

OTHER REFERENCES

Automobile Engineer, July 1944, page 267.

BENJAMIN HERSH, *Primary Examiner.*

A. HARRY LEVY, *Examiner.*